United States Patent
Arsenault et al.

(10) Patent No.: US 10,493,963 B2
(45) Date of Patent: Dec. 3, 2019

(54) MIXED POSITION AND PRESSURE CONTROL FOR HYDRAULIC BRAKE CONTROL APPLICATIONS

(71) Applicant: GOODRICH CORPORATION, Charlotte, NC (US)

(72) Inventors: Tyler Arsenault, Dayton, OH (US); Naison E Mastrocola, Goshen, CT (US)

(73) Assignee: GOODRICH CORPORATION, Charlotte, NC (US)

(*) Notice: Subject to any disclaimer, the term of this patent is extended or adjusted under 35 U.S.C. 154(b) by 0 days.

(21) Appl. No.: 15/960,866

(22) Filed: Apr. 24, 2018

(65) Prior Publication Data

US 2019/0322253 A1 Oct. 24, 2019

(51) Int. Cl.
*B60T 8/17* (2006.01)
*B60T 13/68* (2006.01)
*B60T 13/66* (2006.01)
*B60T 8/171* (2006.01)
*B60T 8/172* (2006.01)
*F16D 66/00* (2006.01)
*B64C 25/44* (2006.01)

(52) U.S. Cl.
CPC ............ *B60T 8/1703* (2013.01); *B60T 8/171* (2013.01); *B60T 8/172* (2013.01); *B60T 13/662* (2013.01); *B60T 13/686* (2013.01); *B64C 25/44* (2013.01); *F16D 66/00* (2013.01); *F16D 2066/003* (2013.01); *F16D 2066/005* (2013.01)

(58) Field of Classification Search
CPC ........ B60T 8/1703; B60T 8/171; B60T 8/172; B60T 8/40; B60T 8/4072; B60T 8/48; B60T 13/16; B60T 13/168; B60T 13/18; B60T 13/20; B60T 13/662; B60T 13/686
USPC ........................................................ 303/126
See application file for complete search history.

(56) References Cited

U.S. PATENT DOCUMENTS

| 4,895,416 A | 1/1990 | Tozu et al. | |
|---|---|---|---|
| 5,505,531 A * | 4/1996 | Griffith | ............... B60T 8/00 188/181 A |

(Continued)

FOREIGN PATENT DOCUMENTS

| DE | 102012200705 | 8/2012 |
|---|---|---|
| EP | 3184382 | 6/2017 |

OTHER PUBLICATIONS

European Patent Office, European Search Report dated Sep. 6, 2019 in Application No. 19168674.0.

*Primary Examiner* — Thomas J Williams
(74) *Attorney, Agent, or Firm* — Snell & Wilmer, L.L.P.

(57) ABSTRACT

A hydraulic brake control system for controlling braking action applied to a wheel includes a brake control unit (BCU) that receives a command signal, a hydraulic actuator that communicates with the BCU through a control valve and a hydraulic power source, the hydraulic actuator also communicating with a position sensor and a pressure sensor, and a wheel assembly configured for operating with the hydraulic actuator to apply a braking torque to a component of the wheel assembly as a result of hydraulic power provided from the hydraulic power source through the control valve to the hydraulic actuator, wherein the BCU is configured to operate the hydraulic brake control system in a position mode and in a pressure mode.

10 Claims, 5 Drawing Sheets

(56) References Cited

U.S. PATENT DOCUMENTS

| | | | |
|---|---|---|---|
| 6,234,585 B1* | 5/2001 | Harris | B60T 7/042 |
| | | | 303/113.4 |
| 8,197,016 B2 | 6/2012 | Metzger, Jr. | |
| 8,886,412 B2* | 11/2014 | Rosol | B60W 10/20 |
| | | | 701/43 |
| 9,387,840 B1 | 7/2016 | Cahill | |
| 2004/0154884 A1 | 8/2004 | Thomas | |
| 2010/0032597 A1* | 2/2010 | Beer | B60T 8/368 |
| | | | 251/129.01 |
| 2010/0276989 A1* | 11/2010 | Metzger, Jr. | B60T 8/00 |
| | | | 303/20 |
| 2010/0292889 A1* | 11/2010 | Cahill | B60T 8/1703 |
| | | | 701/29.1 |
| 2011/0018337 A1 | 1/2011 | King et al. | |
| 2017/0015290 A1 | 1/2017 | Oosawa et al. | |

\* cited by examiner

MIXED POSITION AND PRESSURE CONTROL FOR HYDRAULIC BRAKE CONTROL APPLICATIONS

FIELD

This disclosure relates to braking systems and methods, such as suitable for use in an aircraft.

BACKGROUND

Various types of braking systems are known, including, for example, electrical, mechanical, electromechanical, hydraulic, and pneumatic braking systems, etc. Each type finds utility in various applications. In an aircraft application, uncommanded braking can be dangerous to an aircraft during take-off.

SUMMARY

In various embodiments, a hydraulic brake control system for controlling braking action applied to a wheel includes a brake control unit configured to receive a command signal, the brake control unit comprising a controller and tangible, non-transitory memory; a hydraulic actuator configured for communication with the brake control unit through a control valve and a hydraulic power source, the hydraulic actuator further configured to communicate with a position sensor and a pressure sensor; and a wheel assembly configured for downstream operation with the hydraulic actuator, the wheel assembly configured for applying a braking torque to a component of the wheel assembly as a result of hydraulic power provided from the hydraulic power source through the control valve to the hydraulic actuator; wherein the brake control unit is configured, as operating through the controller and the tangible, non-transitory memory, to operate the hydraulic brake control system in a position mode and in a pressure mode.

In various embodiments: the brake control unit is further configured to calculate a contact point for the brake control unit to operate in the position mode or the pressure mode; and/or the brake control unit is further configured to calculate the contact point in relation to the hydraulic actuator; and/or the brake control unit is further configured to calculate the contact point in relation to the hydraulic actuator operating in conjunction with the pressure sensor; and/or the brake control unit is further configured to calculate the contact point when a pressure within the hydraulic actuator, as measured by the pressure sensor, exceeds a pre-determined set point maintained by the brake control unit; and/or the brake control unit is further configured to operate in the position mode if a piston position of the hydraulic actuator, as measured by the position sensor, is less than or equal to the contact point calculated by the brake control unit; and/or the brake control unit is further configured to operate in the pressure mode if a piston position of the hydraulic actuator, as measured by the position sensor, is greater than the contact point calculated by the brake control unit; and/or the brake control unit is further configured to transition from the position mode to the pressure mode when a piston position of the hydraulic actuator, as measured by the position sensor, is greater than the contact point calculated by the brake control unit; and/or the wheel is a wheel of an aircraft.

In various embodiments, a system for minimizing brake fill in a hydraulic brake control system includes a brake control unit comprising a controller and tangible, non-transitory memory; a hydraulic actuator configured for communication with the brake control unit through a control valve and a hydraulic power source; a position sensor configured for communication with the hydraulic actuator; and a pressure sensor configured for communication with the hydraulic actuator; wherein the brake control unit is configured, as operating through the controller and the tangible, non-transitory memory, to operate the hydraulic brake control system in a position mode and in a pressure mode.

In various embodiments: the brake control unit is further configured to calculate a contact point for the brake control unit to operate in the position mode or the pressure mode; and/or the brake control unit is further configured to transition from the position mode to the pressure mode when a piston position of the hydraulic actuator, as measured by the position sensor, is greater than a contact point calculated by the brake control unit; and/or the brake control unit is further configured to calculate a contact point when a pressure within the hydraulic actuator, as measured by the pressure sensor, exceeds a pre-determined set point maintained by the brake control unit.

In various embodiments, a method of minimizing brake fill in a hydraulic brake control system includes applying a braking force to a component of a wheel assembly as a result of hydraulic power provided from a hydraulic power source through a control valve to a hydraulic actuator; and operating the hydraulic brake control system in a position mode and in a pressure mode to apply the braking force.

In various embodiments: the method also includes calculating a contact point for a brake control unit to operate in the position mode or the pressure mode; and/or calculating the contact point in relation to the hydraulic actuator operating in conjunction with a pressure sensor; and/or calculating the contact point when a pressure within the hydraulic actuator, as measured by the pressure sensor, exceeds a pre-determined set point; and/or operating the hydraulic brake control system in the position mode if a piston position of the hydraulic actuator, as measured by a position sensor, is less than or equal to the contact point; and/or operating the hydraulic brake control system in the pressure mode if a piston position of the hydraulic actuator, as measured by a position sensor, is greater than the contact point; and/or transitioning from the position mode to the pressure mode when a position of the hydraulic actuator, as measured by a position sensor, is greater than the contact point.

BRIEF DESCRIPTION OF THE DRAWINGS

The accompanying drawings illustrate various embodiments employing the principles described herein and are a part of the specification. The illustrated embodiments are meant for description only, and they do not limit the scope of the claims, and in which:

FIG. 4-A and FIG. 4-B are simplified schematics of a brake assembly, in accordance with various embodiments.

DETAILED DESCRIPTION

This detailed description of exemplary embodiments references the accompanying drawings, which show exemplary embodiments by way of illustration. While these exemplary embodiments are described in sufficient detail to enable those skilled in the art to practice this disclosure, it should be understood that other embodiments may be realized and that logical changes and adaptations in design and construction may be made in accordance with this disclosure and the teachings herein described without departing from the scope and spirit hereof. Thus, this detailed description is presented for purposes of illustration only and not of limitation.

In accordance with various aspects of this disclosure, systems and methods are described for mitigating the effects of brake fill when utilizing position only and/or pressure only control for hydraulic brake actuation. In various embodiments, the systems and methods enable smooth transitions between position only and pressure only control, including by lessening pressure spikes following completion of brake fill due to controller overshoot.

Figure 1:
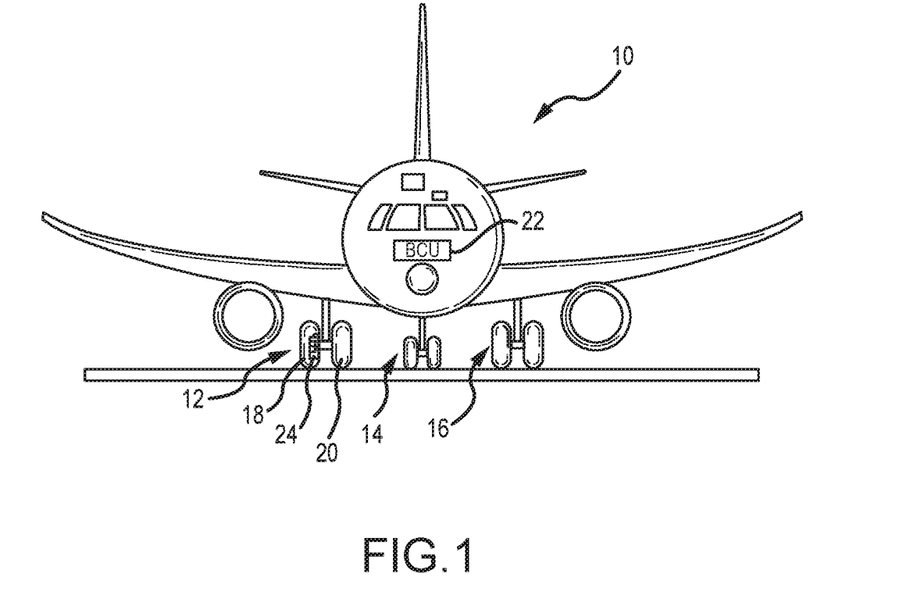
FIG. 1 is a representative illustration of an aircraft having multiple landing gears and wheel assemblies, in accordance with various embodiments.

Referring now to FIG. 1, a representative aircraft 10 is depicted and includes one or more landing gear systems, such as a first landing gear 12, a second landing gear 14, and a third landing gear 16. In various embodiments, the second landing gear 14 is also a nose landing gear for the aircraft 10. Referring generally, the first landing gear 12, the second landing gear 14, and the third landing gear 16 support the aircraft 10 when the aircraft 10 is not flying, such as when the aircraft 10 is taxiing, taking off, landing, and/or parking, as well as when the aircraft 10 is generally at rest and/or not flying, in various embodiments. Operationally, the first landing gear 12, the second landing gear 14, and the third landing gear 16 are retractable into a body and/or fuselage of the aircraft 10 when the aircraft 10 is in flight and/or not supporting the aircraft 10, in various embodiments.

In various embodiments, the first landing gear 12, the second landing gear 14, and/or the third landing gear 16 each include one or more wheel assemblies. For example, the first landing gear 12 includes an outer wheel assembly 18 and an inner wheel assembly 20, in various embodiments. In various embodiments, the various wheel assemblies, such as the outer wheel assembly 18 and the inner wheel assembly 20 of the first landing gear 12 of the aircraft 10, comprise various numbers of wheels.

Referring generally, braking control of the aircraft 10 is generally structured in paired wheel configurations—e.g., the outer wheel assembly 18 is paired with the inner wheel assembly 20 of the first landing gear 12, and likewise for the second landing gear 14 and/or third landing gear 16 as well, in various embodiments. Again referring generally, the outer wheel assembly 18 and the inner wheel assembly 20 are uncoupled, except, for example, for a locked wheel protection, in various embodiments. Likewise, while FIG. 1 depicts a representative aircraft 10 for convenience of illustration, the braking systems and methods described herein are not limited to aircraft applications, but find equivalent utility in other brake fill applications as well.

In various embodiments, the aircraft 10 of FIG. 1 further includes a brake control unit (BCU) 22 located about and/or within the aircraft 10. In various embodiments, the BCU 22 controls, at least various parts of, the braking of the aircraft 10. For example, in various embodiments, the BCU 22 controls various parameters of braking, such as anti-skid braking, automatic brake control, landing gear retraction, locked wheel protection, manual brake control, park capabilities, touchdown protection, etc.

In various embodiments, the aircraft 10 also further includes one or more brakes coupled to each wheel assembly. For example, the first landing gear 12 includes a brake 24 that is coupled to the outer wheel assembly 18, in various embodiments. In operation, the outer wheel assembly 18 applies a braking force to the brake 24 upon receiving a brake command from the BCU 22.

Figure 2:
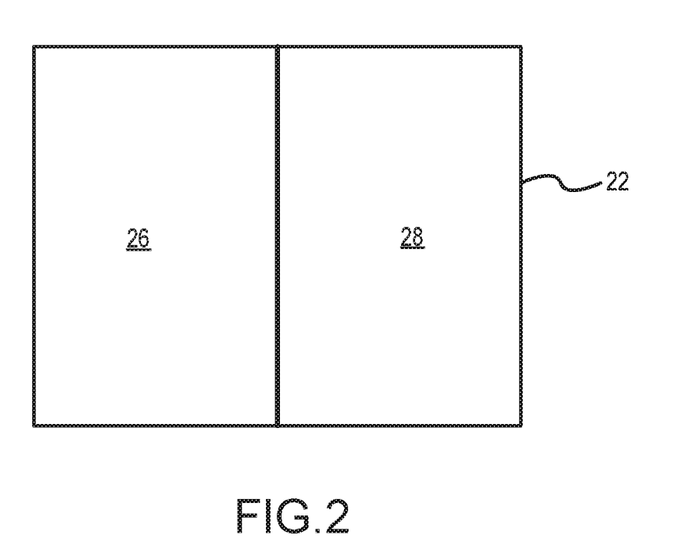
FIG. 2 is a simplified block diagram comprising several components of the brake control unit of FIG. 1, in accordance with various embodiments.

Referring now to FIG. 1 and FIG. 2, the BCU 22 generally includes one or more controllers 26 (e.g., processors) and one or more tangible, non-transitory memories 28 capable of implementing digital or programmatic logic. In various embodiments, for example, the one or more controllers 26 are one or more of an application specific integrated circuit (ASIC), digital signal processor (DSP), field programmable gate array (FPGA), general purpose processor, and/or other programmable logic device, discrete gate, transistor logic, or discrete hardware components, etc., and the one or more memories 28 store machine-readable instructions that are implemented by the one or more controllers 26 for performing various functions, such as mitigating the effects of brake fill when utilizing a pressure only controller, as described herein in various embodiments.

Referring generally, in direct braking systems, the pressure applied to the brakes is proportional to the pressure applied to the brake pedals. In augmented braking systems, on the other hand, the pressure applied to the brakes is controlled and/or driven by a position sensor and/or pressure sensor proximate the one or more brake pedals. For example, in a hydraulic braking system, a braking force is applied to the brakes in proportion to a force or pressure detected by the sensors as requested by a particular driving condition or state of a wheel assembly in communication with a vehicle, transferring pressure from a controlling mechanism (e.g., the brake pedals) to a braking mechanism (e.g., the brakes).

Still referring generally, when an operator initially requests braking and pressurized fluid is first applied to a hydraulic actuator, there is some displacement of the brake components prior to the braking force being able to be exerted on the brake material, in various embodiments. Consequently, an initially measured force or pressure can be low for a period of time until the braking force is actually realized. As a result, there is a period of time and/or position (i.e., a dead zone) when the brake command signal has not yet produced a brake response, in various embodiments.

The above-described condition is known as brake fill, and, as the brake system continues to request more brake output without any measurable results (e.g., the operator has requested braking, but the brakes have not yet responded and/or fully responded with braking action), the brake command signal continues to increase in response, in various embodiments. This also occurs, for example, if a brake system includes an integrator that accumulates products of error and time, in various embodiments. Accordingly, as time passes without sufficient or timely error reduction (e.g., no brake response), a brake system with an integrator or integral action continues to increase its output, in various embodiments. Once the brake if fully able to respond to the command signal (e.g., develops braking torque), the brake then responds to the increased command signal, in various embodiments. This increased command signal typically provides more braking than is desired, and it is the result of the accumulated error and time during the brake fill condition/dead zone. As a consequence of the increased command signal, when braking action is finally produced, it occurs at an elevated level, in various embodiments. Accordingly, such an application of the brakes results in grabbing and/or jerky brake performances, in various embodiments.

As described, brake fill refers to a period of time when a servo-valve is supplying fluid to a hydraulic actuator, but the hydraulic actuator has not yet established sufficient fluid volume to start building sufficient pressure in the hydraulic brake control system. During brake fill, there is little or no palpable feedback from the braking system to identify when contact will be made, and it generally applies in low pressure ranges during brake windup. This results in less than ideal braking performance until contact is established with a brake stack, in various embodiments.

Figure 3:
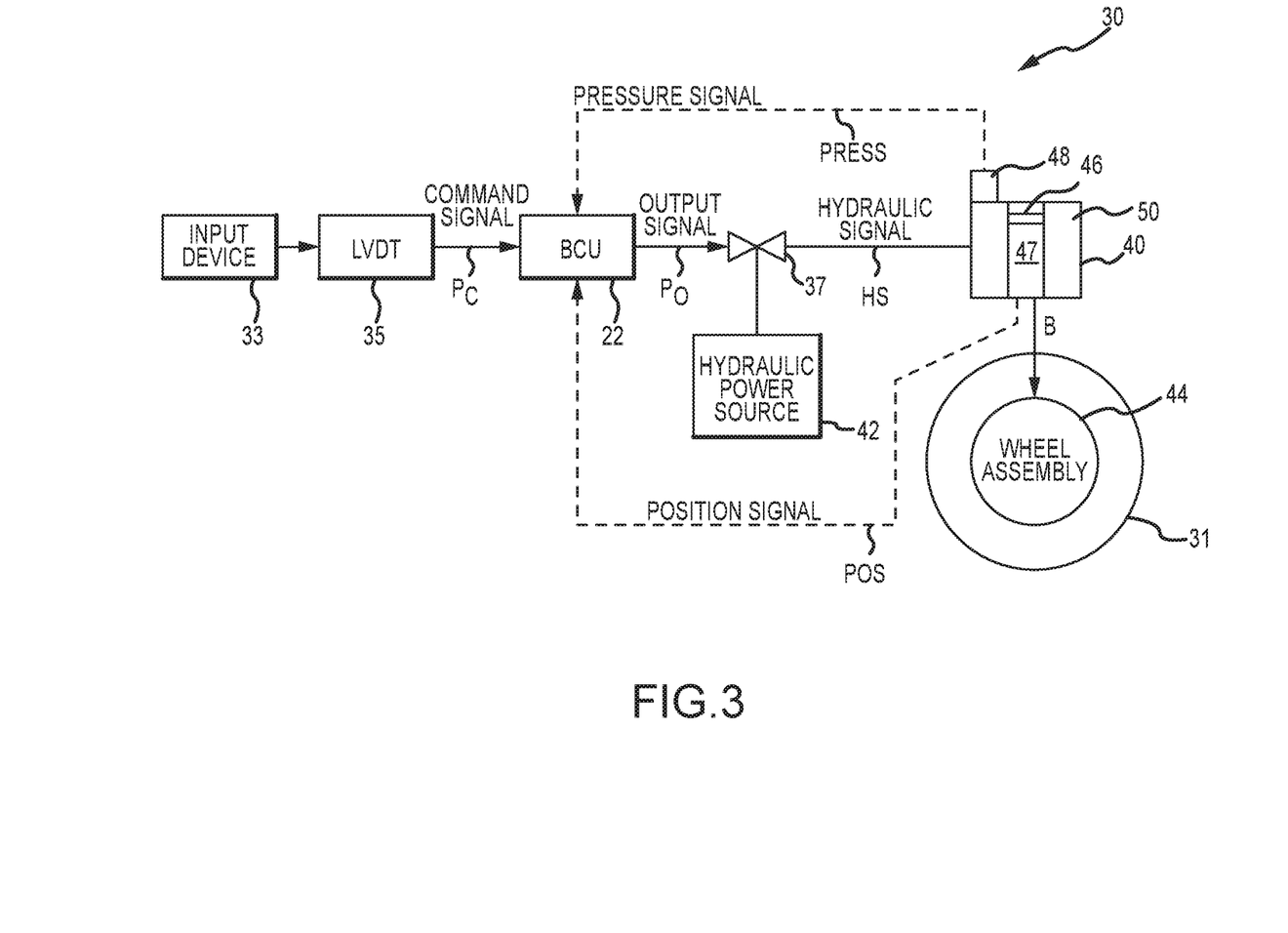
FIG. 3 is a simplified schematic diagram of a hydraulic brake control system, in accordance with various embodiments.

Referring now to FIG. 3, a representative hydraulic brake control system 30 illustrates a simplified architecture for providing brake control of a wheel 31. In operation, the wheel 31 is coupled to a vehicle, such as the aircraft 10 of FIG. 1. As such, the hydraulic brake control system 30 also representatively includes the BCU 22 of FIG. 1 and FIG. 2, in various embodiments.

In various embodiments, the hydraulic brake control system 30 includes an input device 33, such as a brake pedal, which is configured for communication with a downstream linear variable differential transducer (LVDT) 35, which is configured for communication with the downstream BCU 22. More specifically, the LVDT 35 is configured to measure displacement of the input device 33 from a baseline and output a command signal $P_C$ to the BCU 22 as a result of input received from the input device 33, such as from an operator commanding braking from the hydraulic brake control system 30.

The BCU 22 is configured to interpret the command signal $P_C$ as a request to send an output signal $P_O$, such as in the form of a valve current, to a control valve 37 that is downstream from the BCU 22 and configured to modulate pressure supplied to a hydraulic actuator 40 from a hydraulic power source 42. In turn, a downstream wheel assembly 44 is configured in communication with the hydraulic actuator 40 to apply a braking action to the wheel 31 by exerting a braking force or torque B on the wheel assembly 44.

In operation, the hydraulic actuator 40 applies the braking force or torque B to the wheel assembly 44 as a result of a hydraulic signal HS applied by the hydraulic power source 42 through the control valve 37, particularly as the control valve 37 regulates the amount of pressure supplied to the hydraulic actuator 40 from the hydraulic power source 42, all as commanded by the BCU 22 and driven by the input device 33, in various embodiments.

In operation of the hydraulic brake control system 30 during a braking event, the input device 33 signals desired activation of the brakes. Activation of the input device 33 is converted into the command signal $P_C$ by the LVDT 35 that is then provided to the BCU 22, in various embodiments. A relative value of the command signal $P_C$ indicates a degree of engagement of the input device 33 and is proportionally related to the amount of desired braking, in various embodiments. The BCU 22 uses the command signal $P_C$ to derive and provide the output signal $P_O$ to the control valve 37 and/or hydraulic power source 42. The output signal $P_O$ is input into the control valve 37, which applies a desired pressure to the hydraulic actuator 40 via the hydraulic signal HS. In turn, the hydraulic actuator 40 applies the braking force or torque B to the wheel assembly 44 based on the hydraulic signal HS output through the control valve 37. In various embodiments, the hydraulic signal HS creates the braking force or torque B that is applied to the wheel assembly 44, which causes a reduction in the rotational speed of the wheel 31 through friction forces generated by the wheel assembly 44.

In various embodiments, the hydraulic actuator 40 is configured to communicate with a position sensor 46 that measures a position of a piston 47 within the hydraulic actuator 40 in response to the brake being applied by the input device 33. In various embodiments, the position sensor 46 is configured to provide a feedback position signal POS indicative of the position of the piston 47 within the hydraulic actuator 40 to the BCU 22. In various embodiments, the position signal POS output from the position sensor 46 to the BCU 22 represents a position of the piston 47 within the hydraulic actuator 40 as commanded by the BCU 22.

In various embodiments, the hydraulic actuator 40 is further configured to also communicate with a pressure sensor 48 that measures a hydraulic pressure within the hydraulic actuator 40 when the brake is applied by the input device 33. Namely, the pressure sensor 48 is configured to measure the hydraulic signal HS supplied to the hydraulic actuator 40 from the control valve 37 and/or hydraulic power source 42. In various embodiments, the pressure sensor 48 is configured to provide a feedback pressure signal PRESS indicative of the hydraulic pressure within the hydraulic actuator 40 to the BCU 22. In various embodiments, the pressure signal PRESS output from the pressure sensor 48 to the BCU 22 represents a hydraulic pressure supplied to the hydraulic actuator 40 as commanded by the BCU 22.

In various embodiments, the BCU 22 is configured to receive the position signal POS from the position sensor 46 and the pressure signal PRESS from the pressure sensor 48 as feedback inputs into the BCU 22.

In various embodiments, the BCU 22 is configured to determine when the pressure signal PRESS first exceeds a predetermined set point, as maintained, for example, by the one or more tangible, non-transitory memories 28 shown in FIG. 2. When the BCU 22 determines that the pressure signal PRESS first exceeds the predetermined set point, the BCU 22 retains (e.g., within the one or more tangible, non-transitory memories 28 shown in FIG. 2) that particular pressure signal PRESS as a contact point CP indicative of when a brake fill condition has been achieved. The contact point CP is a zero-torque condition, reflecting a condition when there is minimal and/or zero torque in the hydraulic brake control system 30.

Figure 4:
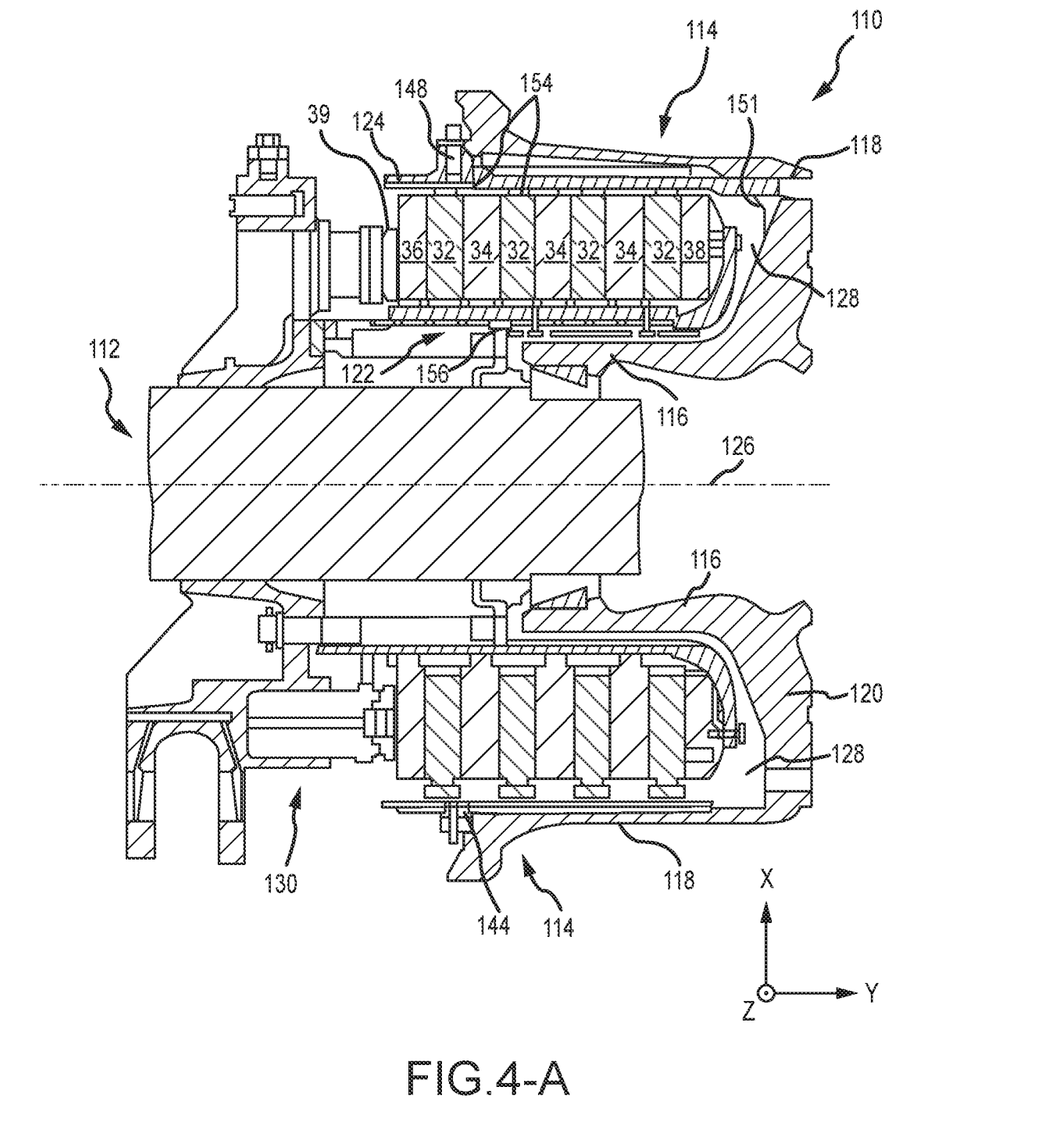

Referring now to FIG. 4-A and FIG. 4-B, a brake assembly 110 for mounting on an axle is located on the aircraft 10 of FIG. 1, in various embodiments. In various embodiments, the brake assembly 110 for mounting on an axle comprises a bogie axle 112, a wheel 114 (e.g., the wheel 31 of FIG. 3) including a hub 116, a wheel well 118, a web 120, a torque take-out assembly 122, one or more torque bars 124, a wheel rotational axis 126, a wheel well recess 128, an actuator 130, multiple brake rotors 32, multiple brake stators 34, a pressure plate 36, an end plate 38, a ram 39, multiple torque bar bolts 148, a torque bar pin 151, multiple rotor lugs 154, and multiple stator slots 156.

Brake disks (e.g., the interleaved brake rotors 32 and brake stators 34) are disposed in the wheel well recess 128 of the wheel well 118. In various embodiments, the brake rotors 32 and the brake stators 34 are referred to collectively as a brake stack or heat sink. In various embodiments, the brake rotors 32 are secured to the torque bars 124 for rotating with the wheel 114, while the brake stators 34 are, in various embodiments, engaged with the torque take-out assembly 122. In various embodiments, at least one actuator 130 is operable to compress the interleaved brake rotors 32 and the brake stators 34 for stopping the aircraft 10 of FIG. 1. In the embodiment of FIG. 4-A and FIG. 4-B, the actuator 130 is shown as a hydraulically actuated piston, although pistons driven pneumatically and by electromechanical actuators are also contemplated herein, in various embodiments. The pressure plate 36 and the end plate 38 are disposed at opposite ends of the interleaved brake rotors 32 and the brake stators 34, and the ram 39 is disposed proximate the pressure plate 36, shown as in contact therewith in FIG. 4-A. This is the contact point CP.

Through compression of the brake rotors 32 and the brake stators 34 between the pressure plate 36 and the end plate 38, the resulting frictional contact slows, stops, and/or prevents rotation of the wheel 114. In various embodiments, the torque take-out assembly 122 is secured to a stationary portion of a landing gear truck, such as a bogie beam or other landing gear strut, such that the torque take-out assembly 122 and the brake stators 34 are prevented from rotating during braking of the aircraft 10 of FIG. 1.

Referring now to FIG. 4-B, it is similar to FIG. 4-A, except the ram 39 is disposed proximate the pressure plate 36, but shown as not in contact therewith in FIG. 4-B.

Referring again to FIG. 3, once the BCU 22 ascertains the contact point CP, it monitors the position signal POS against the contact point CP. If the position signal POS is less than or equal to the contact point CP, then the hydraulic brake control system 30 operates with position control (i.e., the BCU's 22 position control is active). As soon as the position signal POS is greater than the contact point CP, then the hydraulic brake control system 30 operates with pressure control (i.e., the BCU's 22 pressure control is active).

In position control mode, the BCU 22 interprets the relative position of the piston 47 of the hydraulic actuator 40 when setting the desired brake pressure target by the hydraulic actuator 40.

In pressure control mode, the BCU 22 interprets the relative pressure within the hydraulic actuator 40 when setting the desired brake pressure target by the hydraulic actuator 40.

As described, the BCU 22 utilizes the pressure signal PRESS to identify the contact point CP and then operates the hydraulic brake control system 30 in either i) position control when the position signal POS is less than or equal to the contact point CP, or ii) pressure control when the position signal POS is greater than the contact point CP, in various embodiments.

By identifying the contact point CP as the point for transitioning between position control and pressure control, the BCU 22 mitigates issues from using position only control and/or pressure only control for the hydraulic brake control system 30. This enables increased braking performance by improving braking responsiveness during brake fill. Prior to brake fill, the hydraulic brake control system 30 operates according to position control of the hydraulic actuator 40, and, after brake fill, the hydraulic brake control system 30 operates according to pressure control of the hydraulic actuator 40. The BCU 22 transitions from position control to pressure control at the contact point CP and enables command authority during braking while mitigating pressure control effects such as overshoot by not generating too much hydraulic pressure when initially operating in position control during brake fill.

This minimizes the effect of brake fill during brake controller windup as may otherwise occur in the hydraulic brake control system 30 during an initial application of the brakes or during an anti-skid condition. Transitioning from position control to pressure control at the contact point CP decreases error input to the BCU 22 during the brake fill operating condition.

In a hydraulically actuated braking system, such as the hydraulic brake control system 30 of FIG. 3, the time to fill a hydraulic cavity 50 within the hydraulic actuator 40 can negatively impact the overall system performance of the hydraulic brake control system 30, particularly during low commanded pressure (e.g., an initial braking application) and/or with low runway coefficients of friction (e.g., anti-skid) conditions, such as can occur on an icy runway. For example, during an initial braking application initiated by the input device 33, the command signal $P_C$ increases beyond a contact pressure, and the brake fill effect causes a difference between the command signal $P_C$ and the braking force or torque B exerted on the wheel assembly 44. Thus, the brake fill condition increases the time before the output signal $P_O$ begins responding to and/or matching the command signal $P_C$. As a result, without being triggered by the contact point CP as a transition between position control and pressure control, the BCU 22 would otherwise begin ramping the output signal $P_O$ upward without regard to the command signal $P_C$ to minimize the error between the command signal $P_C$ and the output signal $P_O$. When the brake fill condition terminates (e.g., when the hydraulic cavity 50 of the hydraulic actuator 40 is full), however, the hydraulic signal HS begins responding to the previously increased output signal $P_O$. As a result, the braking force or torque B exerted on the wheel assembly 44 increases in an undesired manner, which is observed as grabbing or jerky brake performance in various embodiments. By instead transitioning between position control and pressure control at the contact point CP, these effects are effectively mitigated, in various embodiments, In various embodiments, when operating the hydraulic brake control system 30 first according to position control during brake fill and then according to pressure control after brake fill has subsided—e.g., after the contact point CP has been identified and exceeded—improved braking performance is achieved, such as realized in decreased stopping distance, time, etc. of the wheel 31.

Figure 5:
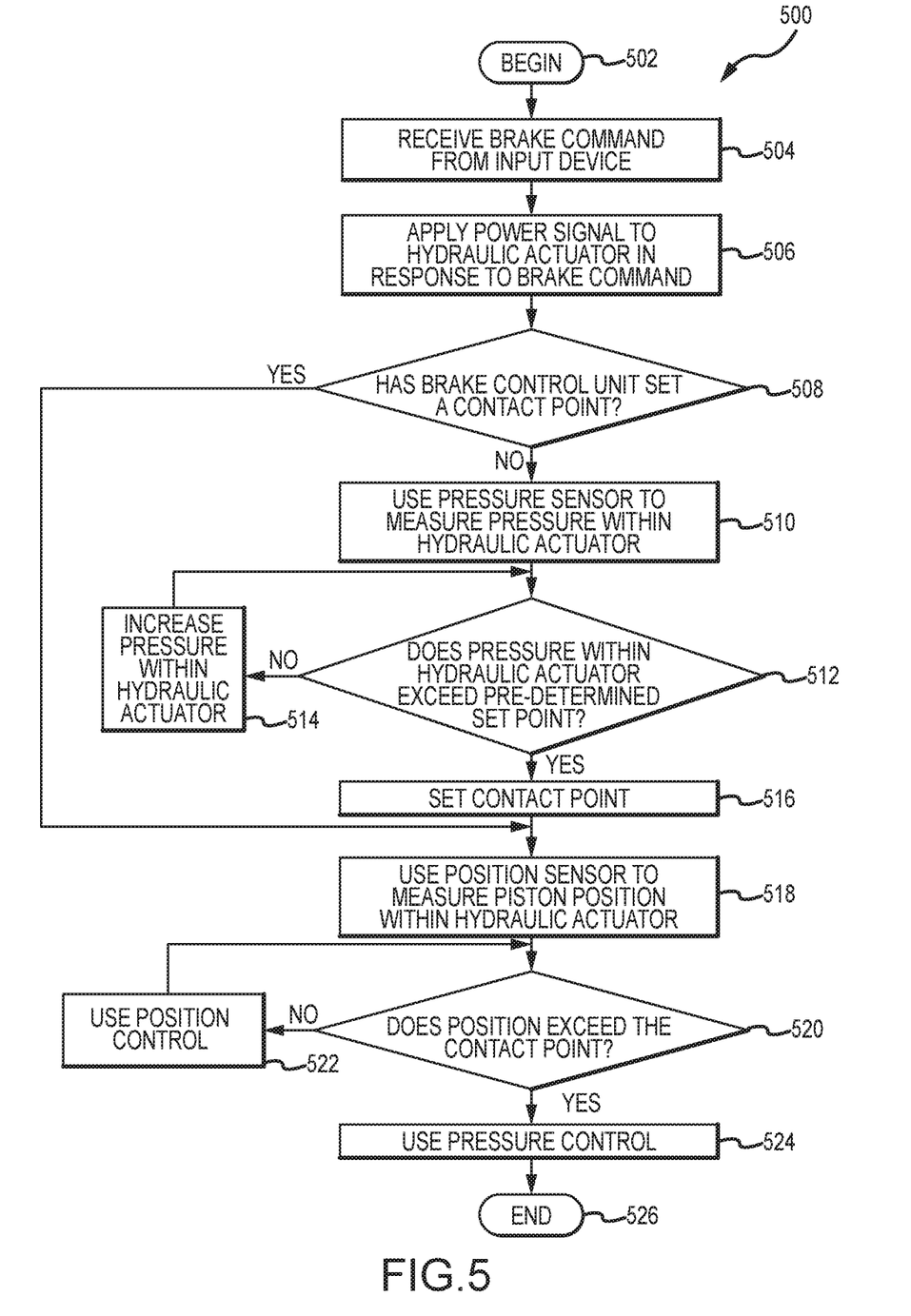
FIG. 5 illustrates a method of mitigating the effects of brake fill when utilizing position only and/or pressure only control for hydraulic brake actuation, in accordance with various embodiments.

Referring now to FIG. 5, a method 500 of mitigating the effects of brake fill begins at a step 502, after which a brake command is received from an input device in a hydraulic brake control system at a step 504. Thereafter, a hydraulic signal is applied to a hydraulic actuator of the hydraulic brake control system in response to the brake command at a step 506.

Thereafter, if a brake control unit of the hydraulic brake control system has not set a contact point at a step 508, then it uses a pressure sensor to measure hydraulic pressure with the hydraulic actuator at a step 510. Alternatively, if the brake control unit of the hydraulic brake control system has set a contact point at step 508, then control passes to step 518.

After step 510, a determination is made at a step 512 as to whether hydraulic pressure within the hydraulic actuator exceeds a pre-determined set point, such as calculated and/or maintained by the brake control unit. If the hydraulic pressure within the hydraulic actuator has not exceeded the pre-determined set point in step 512, then the hydraulic pressure within the hydraulic actuator is increased in a step 514, after which control returns to step 512. In various embodiments, as soon as the pressure within the hydraulic actuator exceeds the pre-determined set point in step 512, then a contact point is set in a step 516, such as by the brake control unit.

Thereafter, a position sensor is used to measure a piston position within the hydraulic actuator in a step 518.

Thereafter, a determination is made at a step 520 as to whether the piston position within the hydraulic actuator exceeds the contact point, such as calculated and/or maintained by the brake control unit. If the piston position within the hydraulic actuator has not exceeded the contact point in step 520, then position control is used by the brake control unit in a step 522, after which control returns to step 520. In various embodiments, as soon as the piston position within the hydraulic actuator exceeds the contact point in step 520, then pressure control is used by the brake control unit in a step 524, after which the method 500 ends at a step 526.

In accordance with the description herein, technical benefits and effects of this disclosure include mitigating the effects of brake fill when utilizing position only and/or pressure only control for hydraulic brake actuation. In various embodiments, the systems and methods enable smooth transitions between position only and pressure only control, including by lessening pressure spikes following completion of brake fill due to controller overshoot. Utilizing the BCU 22 to establish the contact point CP and then using the contact point CP to control the mode of operation improves the performance of the hydraulic brake control system 30, in various embodiments.

Advantages, benefits, and solutions to problems have been described herein with regard to specific embodiments. Furthermore, connecting lines shown in the various figures contained herein are intended to represent exemplary functional relationships and/or physical couplings between the various elements. It should be noted that many additional or alternative functional relationships or physical connections may be present in a practical system. However, the advantages, benefits, solutions to problems, and any elements that may cause any advantage, benefit, or solution to occur or become more pronounced are not to be construed as critical, essential, or required elements or features of this disclosure.

The scope of this disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one, and that reference to an item in the singular may also include the item in the plural, and vice-versa. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B, and C may be present in a single embodiment; for example, A and B, A and C, B and C, or A and B and C. Different cross-hatching may be used throughout the figures to denote different parts, but not necessarily to denote the same or different materials. Like depictions and numerals also generally represent like elements.

The steps recited in any of the method or process descriptions may be executed in any order and are not necessarily limited to the order presented. Furthermore, any reference to singular elements, embodiments, and/or steps includes plurals thereof, and any reference to more than one element, embodiment, and/or step may include a singular one thereof. Elements and steps in the figures are illustrated for simplicity and clarity and have not necessarily been rendered according to any particular sequence. For example, steps that may be performed concurrently or in different order are only illustrated in the figures to help to improve understanding of embodiments of the present, representative disclosure.

Any reference to attached, connected, fixed, or the like may include full, partial, permanent, removable, temporary and/or any other possible attachment option. Additionally, any reference to without contact (or similar phrases) may also include reduced contact or minimal contact. Surface shading lines may be used throughout the figures to denote different areas or parts, but not necessarily to denote the same or different materials. In some cases, reference coordinates may or may not be specific to each figure.

Apparatus, methods, and systems are provided herein. In the detailed description herein, references to "one embodiment," "an embodiment," "various embodiments," etc., indicate that the embodiment described may include a particular characteristic, feature, or structure, but every embodiment may not necessarily include this particular characteristic, feature, or structure. Moreover, such phrases may not necessarily referring to the same embodiment. Further, when a particular characteristic, feature, or structure is described in connection with an embodiment, it is submitted that it is within the knowledge of one skilled in the art to affect such characteristic, feature, or structure in connection with other embodiments, whether or not explicitly described. After reading the description, it will be apparent to one skilled in the relevant art(s) how to implement this disclosure in alternative embodiments.

Furthermore, no component, element, or method step in the present disclosure is intended to be dedicated to the public regardless of whether the component, element, or method step is explicitly recited in the claims. No claim element is intended to invoke 35 U.S.C. § 112(f) unless the element is expressly recited using the phrase "means for." As used herein, the terms "comprises," "comprising," or any other variation thereof, are intended to cover a non-exclusive inclusion, such that an apparatus, article, method, or process that comprises a list of elements does not include only those elements, but it may also include other elements not expressly listed or inherent to such apparatus, article, method, or process.

What is claimed is:

1. A hydraulic brake control system for controlling braking action applied to a wheel, comprising:
    a brake control unit configured to receive a command signal, the brake control unit comprising a controller and tangible, non-transitory memory;
    a hydraulic actuator configured for communication with the brake control unit through a control valve and a hydraulic power source, the hydraulic actuator further configured to communicate with a position sensor and a pressure sensor; and
    a wheel assembly configured for downstream operation with the hydraulic actuator, the wheel assembly configured for applying a braking torque to a component of the wheel assembly as a result of hydraulic power provided from the hydraulic power source through the control valve to the hydraulic actuator,
    wherein the brake control unit is configured, as operating through the controller and the tangible, non-transitory memory, to operate the hydraulic brake control system in a position mode and in a pressure mode, wherein the brake control unit is further configured to calculate a contact point for the brake control unit to operate in the position mode or the pressure mode, wherein the brake control unit is further configured to calculate the contact point in relation to the hydraulic actuator, wherein the brake control unit is further configured to calculate the contact point in relation to the hydraulic actuator operating in conjunction with the pressure sensor, wherein the brake control unit is further configured to calculate the contact point in response to a pressure within the hydraulic actuator, as measured by the pressure sensor, exceeding a pre-determined set point maintained by the brake control unit, and wherein the brake control unit is further configured to operate in the position mode if a piston position of the hydraulic actuator, as measured by the position sensor, is less than or equal to the contact point calculated by the brake control unit.

2. The hydraulic brake control system of claim 1, wherein the brake control unit is further configured to operate in the pressure mode if the piston position of the hydraulic actuator, as measured by the position sensor, is greater than the contact point calculated by the brake control unit.

3. The hydraulic brake control system of claim 1, wherein the wheel is a wheel of an aircraft.

4. A system for minimizing brake fill in a hydraulic brake control system, comprising:
a brake control unit comprising a controller and tangible, non-transitory memory;
a hydraulic actuator configured for communication with the brake control unit through a control valve and a hydraulic power source;
a position sensor configured for communication with the hydraulic actuator; and
a pressure sensor configured for communication with the hydraulic actuator,
wherein the brake control unit is configured, as operating through the controller and the tangible, non-transitory memory, to operate the hydraulic brake control system in a position mode and in a pressure mode, and
wherein the brake control unit is further configured to transition from the position mode to the pressure mode in response to a piston position of the hydraulic actuator, as measured by the position sensor, being greater than a contact point calculated by the brake control unit.

5. The system of claim 4, wherein the brake control unit is further configured to calculate the contact point for the brake control unit to operate in the position mode or the pressure mode.

6. The system of claim 4, wherein the brake control unit is further configured to calculate the contact point when a pressure within the hydraulic actuator, as measured by the pressure sensor, exceeds a pre-determined set point maintained by the brake control unit.

7. A method of minimizing brake fill in a hydraulic brake control system, comprising:
applying a braking force to a component of a wheel assembly as a result of hydraulic power provided from a hydraulic power source through a control valve to a hydraulic actuator;
operating the hydraulic brake control system in a position mode and in a pressure mode to apply the braking force;
calculating a contact point for a brake control unit to operate in the position mode or the pressure mode;
calculating the contact point in relation to the hydraulic actuator operating in conjunction with a pressure sensor;
calculating the contact point when a pressure within the hydraulic actuator, as measured by the pressure sensor, exceeds a pre-determined set point; and
operating the hydraulic brake control system in the position mode if a piston position of the hydraulic actuator, as measured by a position sensor, is less than or equal to the contact point.

8. The method of claim 7, further comprising:
transitioning from the position mode to the pressure mode when a position of the hydraulic actuator, as measured by the position sensor, is greater than the contact point.

9. A hydraulic brake control system for controlling braking action applied to a wheel, comprising:
a brake control unit configured to receive a command signal, the brake control unit comprising a controller and tangible, non-transitory memory;
a hydraulic actuator configured for communication with the brake control unit through a control valve and a hydraulic power source, the hydraulic actuator further configured to communicate with a position sensor and a pressure sensor; and
a wheel assembly configured for downstream operation with the hydraulic actuator, the wheel assembly configured for applying a braking torque to a component of the wheel assembly as a result of hydraulic power provided from the hydraulic power source through the control valve to the hydraulic actuator,
wherein the brake control unit is configured, as operating through the controller and the tangible, non-transitory memory, to operate the hydraulic brake control system in a position mode and in a pressure mode,
wherein the brake control unit is further configured to calculate a contact point for the brake control unit to operate in the position mode or the pressure mode,
wherein the brake control unit is further configured to calculate the contact point in relation to the hydraulic actuator,
wherein the brake control unit is further configured to calculate the contact point in relation to the hydraulic actuator operating in conjunction with the pressure sensor,
wherein the brake control unit is further configured to calculate the contact point in response to a pressure within the hydraulic actuator, as measured by the pressure sensor, exceeding a pre-determined set point maintained by the brake control unit, and
wherein the brake control unit is further configured to transition from the position mode to the pressure mode when a piston position of the hydraulic actuator, as measured by the position sensor, is greater than the contact point calculated by the brake control unit.

10. A method of minimizing brake fill in a hydraulic brake control system, comprising:
applying a braking force to a component of a wheel assembly as a result of hydraulic power provided from a hydraulic power source through a control valve to a hydraulic actuator;
operating the hydraulic brake control system in a position mode and in a pressure mode to apply the braking force;
calculating a contact point for a brake control unit to operate in the position mode or the pressure mode;

calculating the contact point in relation to the hydraulic actuator operating in conjunction with a pressure sensor;

calculating the contact point when a pressure within the hydraulic actuator, as measured by the pressure sensor, exceeds a pre-determined set point; and operating the hydraulic brake control system in the pressure mode if a piston position of the hydraulic actuator, as measured by a position sensor, is greater than the contact point.

* * * * *